US012579813B2

(12) United States Patent 
Eatch

(10) Patent No.: US 12,579,813 B2 
(45) Date of Patent: Mar. 17, 2026

(54) SYSTEMS AND METHODS FOR PRINTED CODE INSPECTION

(71) Applicant: AUTOCODING SYSTEMS LIMITED, Cheshire (GB)

(72) Inventor: Robin William Eatch, Cheshire (GB)

( * ) Notice: Subject to any disclaimer, the term of this patent is extended or adjusted under 35 U.S.C. 154(b) by 642 days.

(21) Appl. No.: 17/595,871

(22) PCT Filed: May 21, 2020

(86) PCT No.: PCT/GB2020/051243 
§ 371 (c)(1), 
(2) Date: Nov. 29, 2021

(87) PCT Pub. No.: WO2020/240160 
PCT Pub. Date: Dec. 3, 2020

(65) Prior Publication Data 
US 2022/0237931 A1 Jul. 28, 2022

(30) Foreign Application Priority Data

May 31, 2019 (GB) ...................................... 1907785

(51) Int. Cl. 
*G06V 20/52* (2022.01) 
*G06V 20/62* (2022.01) 
(Continued)

(52) U.S. Cl. 
CPC .............. *G06V 20/52* (2022.01); *G06V 20/62* (2022.01); *G06V 20/66* (2022.01); *G06V 30/133* (2022.01); 
(Continued)

(58) Field of Classification Search 
CPC ........ G06V 20/52; G06V 20/62; G06V 20/66; G06V 30/133; G06V 30/146; 
(Continued)

(56) References Cited

U.S. PATENT DOCUMENTS

| | | | |
|---|---|---|---|
| 5,384,864 A | 1/1995 | Spitz | |
| 5,907,630 A | 5/1999 | Naoi et al. | |

(Continued)

FOREIGN PATENT DOCUMENTS

CN 108304835 A 7/2018

OTHER PUBLICATIONS

Communication mailed Oct. 18, 2023, issued in corresponding EP Application No. 20729163.4 , filed May 21, 2020, 7 pages.

(Continued)

*Primary Examiner* — Wesley J Tucker 
*Assistant Examiner* — Han Hoang 
(74) *Attorney, Agent, or Firm* — Christensen O'Connor Johnson Kindness PLLC

(57) ABSTRACT

This specification describes methods and systems for printed code inspection. For instance, the specification describes a computer-implemented method for printed code inspection by a printed code inspection system operating in conjunction with a production line apparatus configured to move objects along a production line comprising: receiving an image of an object to which a printed code comprising one or more printed characters should have been applied, the image having been captured when the object was located at a particular position on the production line; analysing the image to detect, based on a set of one or more character identification parameters, at least one candidate character within the image; determining, for each of the at least one candidate characters and based on a set of one or more candidate character properties, a likelihood that the candidate character is one of the printed characters of the printed code that should have been applied to the object; determining, based on the candidate characters determined as being likely to be one of the printed characters of the printed code that should have been applied to the object, whether the (Continued)

printed code is present and legible on the object; and outputting an indication as to whether the printed code that should have been applied to the object is present and legible on the object.

22 Claims, 7 Drawing Sheets

(51) Int. Cl.

| | |
|---|---|
| *G06V 20/66* | (2022.01) |
| *G06V 30/12* | (2022.01) |
| *G06V 30/146* | (2022.01) |
| *G06V 30/148* | (2022.01) |
| *G06V 30/244* | (2022.01) |
| *G06V 30/424* | (2022.01) |
| *G06V 30/10* | (2022.01) |

(52) U.S. Cl.
CPC .......... *G06V 30/146* (2022.01); *G06V 30/153* (2022.01); *G06V 30/245* (2022.01); *G06V 30/424* (2022.01); *G06V 30/10* (2022.01)

(58) Field of Classification Search
CPC .. G06V 30/153; G06V 30/245; G06V 30/424; G06V 30/10; G06V 10/22; G06V 30/158
See application file for complete search history.

(56) References Cited

U.S. PATENT DOCUMENTS

| | | | |
|---|---|---|---|
| 6,382,510 B1* | 5/2002 | Ni | G01N 21/8851 |
| | | | 235/462.1 |
| 8,787,660 B1 | 7/2014 | Simon et al. | |
| 2005/0018896 A1 | 1/2005 | Heit et al. | |
| 2012/0106787 A1 | 5/2012 | Nechiporenko et al. | |
| 2017/0152070 A1* | 6/2017 | Roe | B65C 3/16 |
| 2019/0272438 A1* | 9/2019 | Liu | G06N 3/045 |
| 2021/0090243 A1* | 3/2021 | Kawanishi | G06F 16/55 |
| 2022/0058416 A1* | 2/2022 | Vengalil | G06V 20/582 |

OTHER PUBLICATIONS

Combined Search and Examination Report mailed Nov. 22, 2019, issued in corresponding GB Application No. 1907785.8, filed May 31, 2019, 8 pages.
Examination Report mailed Dec. 17, 2020, issued in corresponding GB Application No. 1907785.8, filed May 31, 2019, 3 pages.
International Search Report and Written Opinion mailed Jan. 26, 2021 [replacement version], issued in corresponding International Application No. PCT/GB2020/051243, filed May 21, 2020, 10 pages.
Examination Report mailed Mar. 26, 2025, issued in corresponding Australian Application No. 2020281288, filed May 21, 2020, 3 pages.
Communication mailed Aug. 4, 2025, issued in corresponding European Application No. 20729163.4 filed May 21, 2020, 4 pages.

\* cited by examiner

60

61

61

61

SYSTEMS AND METHODS FOR PRINTED CODE INSPECTION

BACKGROUND

Conventional printed code inspection techniques often rely on performing optical character recognition (OCR) over an entire image in order to detect any printed characters within the image. Characters which are recognised are then used to determine whether the code has been printed correctly. These techniques which perform OCR over the entire image can be computationally demanding and thus slow to use.

As mentioned previously, conventional printed code inspection techniques often rely on performing OCR over an entire image. One solution in the art to reduce the amount of time taken to perform OCR over an entire image is to define a specific search region in the image so that the area of the image in which the OCR is performed is limited. However, this requires a user to manually input a specific search region. As a result, the up-front configuration required is increased, and a time delay before a system using such a technique can be operational is increased.

OCR may also require a significant amount of pre-training in order to recognise characters in the printed code. Conventional techniques using OCR may therefore require significant time and computational resources to collect training data and to perform the pre-training. As a result, a time delay before the system can be operational is increased.

Some coding technologies, such as continuous inkjet printing technology, print characters by placing groups of dots. A problem associated with conventional techniques using OCR when the code is printed using such coding technologies is that, due to the lack of continuity in the shape of each character, the proximity of adjacent characters, and the similarity of different characters, characters are prone to be misinterpreted, leading to erroneous results.

Conventional techniques cannot determine when the expected printed code should include variable elements, such as the current time. One solution for this problem is for a user to mask out areas including variable elements so that OCR is not performed on these areas. However, this again increases the setup time for a system using this technique.

In addition, conventional systems for printed code inspection require setup independently from each of the other devices involved in printed code inspection each time the printed code is changed. As a result, downtime where the systems must be reconfigured and thus cannot be used is increased.

SUMMARY

This specification describes methods and systems for printed code inspection which may address a number of the above-described drawbacks and limitations associated with conventional printed code inspection.

Accordingly, in a first aspect this specification describes a computer-implemented method for printed code inspection by a printed code inspection system operating in conjunction with a production line apparatus configured to move objects along a production line comprising: receiving an image of an object to which a printed code comprising one or more printed characters should have been applied, the image having been captured when the object was located at a particular position on the production line; analysing the image to detect, based on a set of one or more character identification parameters, at least one candidate character within the image; determining, for each of the at least one candidate characters and based on a set of one or more candidate character properties, a likelihood that the candidate character is one of the printed characters of the printed code that should have been applied to the object; determining, based on the candidate characters determined as being likely to be one of the printed characters of the printed code that should have been applied to the object, whether the printed code is present and legible on the object; and outputting an indication as to whether the printed code that should have been applied to the object is present and legible on the object In a second aspect, this specification describes a computer-implemented method for printed code inspection comprising: receiving an image which contains a printed code comprising one or more printed characters; analysing the image to detect, based on a set of one or more character identification parameters, at least one candidate character within the image; and determining, for each of the at least one candidate characters and based on a set of one or more candidate character properties, a likelihood that the candidate character is one of the printed characters of the printed code. The method may further comprise determining, based on the candidate characters determined as being likely to be one of the printed characters of the printed code, whether the printed code contained in the image is present and legible.

Determining whether the printed code is present and legible may further comprise determining dimensions of an area encompassing the candidate characters determined as being likely to be one of the printed characters of the printed code based on dimensions of the candidate characters determined as being likely to be one of the printed characters of the printed code. In addition or alternatively, the method may further comprise, for each candidate character determined as being likely to be one of the printed characters of the printed code, converting pixels contained by the candidate character determined as being likely to be one of the printed characters of the printed code into a text character using optical character recognition. In such examples the method may further comprise determining whether the printed code is correct based on the text characters.

The method may further comprise outputting an indication as to whether the printed code is present and legible. Outputting the indication as to whether the printed code is present and legible may comprise outputting the indication to a packaging line control apparatus. In addition or alternatively, outputting the indication as to whether the printed code is present and legible may comprise outputting the indication for display.

The method may further comprise generating a processed image comprising the received image and at least one of: an indicator of a location for each detected candidate character, a bounding box of each candidate character determined as being likely to be one of the printed characters of the printed code, and an area encompassing the candidate characters determined as being likely to be one of the printed characters of the printed code; and causing display of the processed image.

The set of one or more candidate identification parameters may comprise one or more parameters indicative of a number of connected pixels, and analysing the image to identify the at least one candidate character of the printed code may comprise: detecting a set of connected pixels in the binary image; determining a number of pixels in the set of connected pixels; and determining that the set of connected pixels is a candidate character based on a comparison between the number of pixels in the set of connected pixels and the one or more parameters indicative of the number of connected pixels. Additionally or alternatively, the set of one or more character identification parameters comprises one or more parameters indicative of an elongation, and analysing the image to identify the at least one candidate character of the printed code may comprise: detecting a set of connected pixels in the binary image; determining an elongation of the set of connected pixels; and determining that the set of connected pixels is a candidate character based on a comparison between the elongation of the set of connected pixels and the one or more parameters indicative of an elongation. Additionally or alternatively, the set of character identification parameters may comprise one or more parameters indicative of a compactness, and analysing the image to identify the at least one candidate character of the printed code may comprise: detecting a set of connected pixels in the binary image; determining a compactness of the set of connected pixels; and determining that the set of connected pixels is a candidate character based on a comparison between the compactness of the set of connected pixels and the one or more parameters indicative of a compactness.

The set of one or more candidate character properties may comprise one or more properties indicative of a skew angle, and determining that the candidate character is likely to be one of the printed characters of the printed code may comprise: determining a principal axis of the candidate character; determining a skew angle of the candidate character based on the principal axis; and determining that the candidate character is likely to be one of the printed characters of the printed code based on a comparison of the skew angle and the one or more properties indicative of a skew angle. Additionally or alternatively, the set of one or more candidate character properties may comprise one or more properties indicative of a bounding box area or dimensions, and determining that the candidate character is likely to be one of the printed characters of the printed code may further comprise: generating a bounding box around the candidate character; determining an area or dimensions of the bounding box; and determining that the candidate character is likely to be one of the printed characters of the printed code based on a comparison of the area or dimensions of the bounding box and the one or more properties indicative of a bounding box area or dimensions.

The method may further comprise: determining a region of interest in the image; wherein analysing the image comprises analysing only a portion of the image within the region of interest to detect at least one candidate character within the region of interest. In such examples, determining the region of interest in the image may comprise receiving an indication of the location and dimensions of the region of interest.

The method may further comprise, prior to receiving the image: receiving a previous image containing a previous printed code comprising one or more printed characters; analysing, using an initial set of one or more character identification parameters, the previous image to detect at least one candidate character in the previous image; causing display of the previous image and indications of the at least one candidate character in the previous image; for each candidate character detected in the previous image, receiving a user indication indicating whether the candidate character is one of the printed characters of the previous printed code; and determining, based on the candidate characters indicated as being one of the printed characters, the set of one or more character identification parameters for use in analysing the image to detect candidate characters and/or the set of one or more candidate character properties for use in determining likelihoods that the candidate characters detected in the image are printed characters of the printed code.

In such examples, the method may further comprise: for each candidate character detected in the previous image which is not indicated by the user as being one of the printed characters of the previous printed code, determining that the candidate character is not one of the printed characters of the previous printed code. Alternatively, the method may further comprise: receiving one or more user indications indicating the candidate characters which are not one of the printed characters of the previous printed code.

The user indication may comprise a selection of an individual indicator associated with a respective candidate character detected in the previous image. Alternatively, the user selection may comprise a selection of an area of the previous image, the selected area containing at least one indicator of a location of a candidate character detected in the previous image.

Determining the set of one or more character identification parameters and the set of one or more candidate character properties may be further based on the candidate characters which are indicated as being not one of the printed characters of the previous printed code.

Determining the set of one or more character identification parameters and the set of one or more candidate character properties may be based on at least one of: a maximum value found among the candidate characters indicated as being one of the printed characters of the previous printed code; a minimum value found among the candidate characters indicated as being one of the printed characters of the previous printed code; a maximum value found among the candidate characters indicated as being not one of the printed characters of the previous printed code; and a minimum value found among the candidate characters indicated as being not one of the printed characters of the previous printed code.

The method may further comprise receiving printing data for the printed code, the printing data defining expected characteristics for the printed code; configuring the set of one or more character identification parameters and the set of one or more candidate character properties based on the printing data; and determining, based on the candidate characters determined as being likely to be one of the printed characters of the printed code and the printing data, whether the printed code is present and legible. In such examples, the printing data may be received from a coding device.

Additionally or alternatively, the expected characteristics for the printed code may comprise an expected format of the printed code. In such examples, the expected format may comprise at least one of a character size of characters of the printed code, a number of rows and/or columns of characters in the printed code, and a number of characters in each row and/or column of the printed code.

The expected characteristics for the printed code may comprise an expected content of the printed code. In such examples, the expected content may comprise at least one of a fixed element, a variable element, a counter element, and a real time clock element.

Additionally or alternatively, the method may further comprise generating a match string from the expected content; for each candidate character determined as being likely to be one of the printed characters of the printed code, converting pixels contained by the candidate character determined as being likely to be one of the printed characters of the printed code into a text character using optical character recognition, determining whether the recognised text characters are correct based on a comparison with the match string. In such examples, generating the match string may comprise inserting wildcard characters based on the expected content. Additionally or alternatively, determining whether the recognised text characters are correct may comprise comparing the recognised text characters with real time clock data.

The printing data may comprise at least one of date information, time information, print count, and an expected size of an area encompassing the candidate characters determined as being likely to be one of the printed characters of the printed code.

The method may further comprise applying a median filter to the image, wherein the median filter comprises a median filter kernel size; and applying an adaptive binarization filter to the image to provide a binary image, wherein the adaptive binarization filter comprises at least one of a binarization filter kernel size, and a binarization filter threshold.

In a third aspect, this specification describes an apparatus configured to perform any method described in relation to the first or second aspect. The apparatus may further comprise a camera device to provide the received image. In such examples, the camera device may comprise one or more optical elements configured to cause the image to be smoothed.

In a fourth aspect, this specification describes a camera device configured to perform any method described in relation to the first or second aspect. The camera device may comprise one or more optical elements configured to cause the image to be smoothed.

In a fifth aspect, the specification describes one or more non-transitory computer readable instructions executable by a processor to perform any method described in relation to the first or second aspect.

BRIEF DESCRIPTION OF THE FIGURES

For a more complete understanding of the methods, apparatuses and computer-readable instructions described herein, reference is now made to the following description taken in connection with the accompanying Figures, in which.

DETAILED DESCRIPTION

Figure 1:
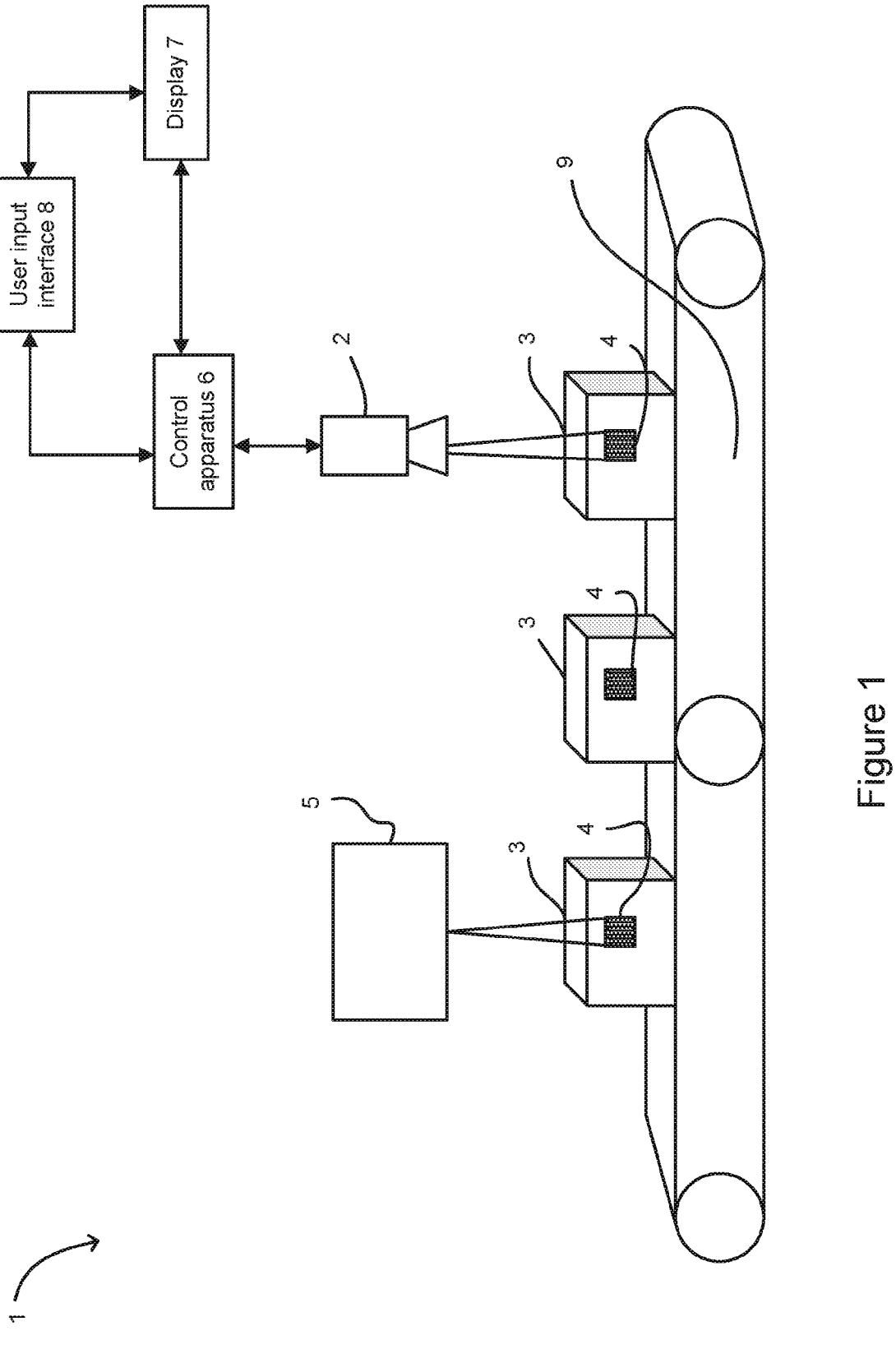
FIG. 1 illustrates an example of a printed code inspection system.

In the description and drawings, like reference numerals may refer to like elements throughout.

This application describes systems and techniques for performing printed code inspection. The systems and techniques detect candidate characters in an image by means of a number of filters applied to the image. The systems and techniques determine, according to certain criteria, which of these candidate characters are likely to be printed characters forming a printed code to be inspected. When suitable filters and criteria are applied, the systems and techniques result in a robust determination of candidate characters which are likely to be printed characters forming the printed code, which can then be located, counted and grouped to enable a determination as to whether the printed code is present, legible and correct.

FIG. 1 illustrates an example of a printed code inspection system 1. The printed code inspection system 1 may include a camera device 2. The camera device 2 may capture an image of an object 3. The image of the object 3 may include a printed code 4 which has been applied to the object 3. The printed code 4 may include a number of printed characters or shapes. The image may also include a number of characters and graphics applied to the object 3 which do not form part of the printed code 4. The camera device 2 may be any type of device which can capture an image. In some specific examples, the object 3 may be a packaging of a product.

In some examples, the printed code inspection system 1 may operate in conjunction with a coding device 5. The coding device 5 may apply the printed code 4 to the object 3. The coding device 5 may be any type of coding device 5 which can apply a printed code 4 to an object 3. For instance, the coding device 5 may use continuous ink jet technology (CIJ), thermal ink jet technology (TIJ), thermal transfer technology (TTO), laser ablation, or any other type of industrial coding and/or marking technology. In other examples, the coding device may apply a printed code 4 to a medium, e.g. a label, which is then applied, by the coding device 5 or otherwise (e.g. manually), to the object 3.

In some specific examples, the printed code inspection system 1 may additionally or alternatively operate in conjunction with a production line apparatus 9. As will be appreciated, however, the printed code inspection system 1 may operate in isolation from a production line apparatus 9 and/or a coding device 5. The production line apparatus 9 may move the object 3 along a production line. For instance, the production line apparatus 9 may move an object 3 from a position in which the printed code 4 can be applied to the object 3 by the coding device 5, to a position in which the camera device 2 of the printed code inspection system 1 can capture an image of the object 3. In some implementations, the production line apparatus 9 may be configured to redirect, or otherwise alert a human operator regarding, objects 3 which are determined to have printed codes 4 which are not present, legible and/or correct.

The printed code inspection system 1 may operate under the control of control apparatus 6, which may be included in, or separate from the camera device 2. As will explained in more detail below, the printed code inspection system 1, under the control of the control apparatus (or otherwise), may be configured to output information for display on one or more displays 7. In addition, the printed code inspection system 1 may be configured to receive user inputs for controlling operation of the printed code inspection system 1 via a user input interface 8. The user input interface 8 may be of any suitable type, such as a physical keyboard, a touch interface, a voice controlled interface, a gesture based interface, or a pointing device. In some examples, the printed code inspection system 1 may output messages and/or instructions to the production line apparatus 9, for instance to indicate objects 3 which are determined to have printed codes 4 which are not present, legible, and/or correct.

The printed code inspection system 1 may be configured to analyse an image to identify sets of connected pixels in the image. The printed code inspection system 1 may make use of a set of character identification parameters. The set of character identification parameters may be used to identify sets of connected pixels which could potentially be a character of interest (e.g. a letter, number, symbol or shape). These characters of potential interest may be referred to as "candidate characters". Sets of the connected pixels detected in the image may be compared with the character identification parameters to identify which sets of connected pixels represent candidate characters. The character identification parameters may include, for example, one or more parameters indicative of a number of connected pixels in a set of connected pixels, one or more parameters indicative of an elongation of a set of connected pixels, and/or one or more parameters indicative of a compactness of a set of connected pixels.

The printed code inspection system 1 may make use of a set of candidate character properties. The set of candidate character properties may be used to determine whether a candidate character is likely to be a printed character of the printed code 4. The set of candidate character properties may include properties indicative of a skew angle of a candidate character, properties indicative of a bounding box area of a candidate character, and/or properties indicative of a character height and/or width.

The set of character identification parameters and/or the set of candidate character properties may include one or more ranges of permissible values, ranges of unacceptable values, maximum thresholds, and/or minimum thresholds. In some examples, the set of character identification parameters and/or the set of candidate character properties may be manually set when the printed code inspection system 1 is first used. In other examples, the set of character identification parameters and/or the set of candidate character properties may be pre-determined, for instance, by the manufacturer. In yet other examples, the set of character identification parameters and/or the set of candidate character properties may be set and/or refined by the printed code inspection system 1 based on a user indication of characters which are and/or are not printed characters of the printed code 4.

The set of character identification parameters and/or the set of candidate character properties may be stored after the printed code inspection system 1 has operated on at least one received image, along with the results of said operation. The stored set of character identification parameters and/or the set of candidate character properties and corresponding results may be available for viewing, selection and/or modification for use in subsequent operations by the printed code inspection system 1.

In some examples, a particular set of character identification parameters, a particular set of candidate character properties and/or any other particular configuration settings may stored for use by the printed code inspection system 1 upon startup. In such cases, the printed code inspection system 1 may be configured to automatically operate using the stored configuration settings in a headless operation mode.

Using the character identification parameters and candidate character properties, the printed code inspection system 1 may be able to determine whether a printed code 4 on an object 3 is present and legible. As such, the printed code inspection system 1 may provide an indication of whether the printed code 4 is present and legible without requiring the use of OCR. The printed code inspection system 1 may therefore have an improved speed of operation and a lower computational power requirement. The printed code inspection system 1 may also have a reduced configuration time, for instance, because it does not require a search region to be manually specified and does not require pre-training.

In some examples, there may be an operational requirement to determine that the characters of the printed code 4 are the correct characters. In such examples, the printed code inspection system 1 may perform OCR. The printed code inspection system 1 may perform OCR only on the candidate characters determined to be likely to be printed characters in order to determine whether the printed characters are correct. As a result, the printed code inspection system 1, even when it does perform OCR, may have an improved speed and may require lower computational power for operation.

Operation of a printed code inspection system 1, for instance, as has been described above with reference to FIG. 1, will now be described in more detail in relation to the flow chart of FIG. 2. As will be appreciated, in some examples some of the operations depicted in FIG. 2 (such as, but not exclusively, those shown with dashed lines) may be omitted.

The printed code inspection system 1 may control the camera device 2 to capture images. In operation, 2.1, the printed code inspection system 1 may receive one or more captured images from the camera device 2.

In some examples, the camera device 2 may modify the images upon capturing the images. For instance, the camera device 2 may cause at least one of the images to be rotated, flipped and/or mirrored. Additionally or alternatively, another component of the printed code inspection system 1 may perform this functionality after the printed code inspection system 1 has received the one or more captured images. This may increase the number positions/orientations at which the camera device 2 can be mounted relative to the production line apparatus 9.

In operation 2.2, the printed code inspection system 1 may apply image conditioning techniques to the received images for further processing. For instance, the image conditioning techniques may include applying a median filter to the images in order to smooth the images. This may be particularly beneficial for particular types of coding technologies where the printed characters are formed of groups of separate elements (e.g. dots). The median filter may include a median filter kernel size. The median filter kernel size may be selected to have a value between 1 and 21 pixels, depending on the level of reduction of background noise required. The median filter kernel size may be an odd value.

Additionally or alternatively, the median filter kernel size may be selected based on a hardware configuration of the camera device 2 and/or another component of the printed code inspection system 1. For instance, the camera device 2 may include at least one dedicated hardware device (e.g. an on-board FPGA) which is capable of performing median filtering using a particular median filter kernel size (e.g. a median filter kernel size of 3×3 pixels). In such cases, when the median filter kernel size is selected to correspond to the particular median filter kernel size of the dedicated hardware device of the camera device 2, the dedicated hardware device of the camera device 2 may perform the median filtering of the image. In this way, the performance of the median filtering may be much faster.

The image conditioning techniques may include applying an adaptive binarization filter to produce a binary image from each of the received images. The adaptive binarization filter may include a binarization filter kernel size and/or a binarization filter threshold. The binarization filter threshold of the adaptive binarization filter may vary in different areas of an image. The binarization filter threshold may be determined based on a contrast between the printed characters and a background of the image, or may be a value selected by the user.

In some examples, a standard (or simple) binarization filter may be used instead of or in addition to the adaptive binarization filter. The standard binarization filter may include a global binarization filter threshold where a single binarization filter threshold value is applied across an entire image. The value for the global binarization filter threshold may be determined in the same ways as described for the binarization filter threshold.

The user may be able to select between use of an adaptive binarization filter or a standard binarization filter. An indication of this selection and/or the filter threshold and/or the kernel size may be stored along with the other configuration settings (as discussed above).

In operation 2.3, the printed code inspection system 1 may determine a region of interest in the received images. The printed code inspection system 1 may limit the area of the images to be analysed to that within the regions of interest. The region of interest may be determined automatically or manually, and/or received from an external device. Although there may be benefits to determining a region of interest, the printed code inspection system 1 may function effectively even when there is no region of interest determination.

As discussed above, in operation 2.4 the printed code inspection system 1 (e.g. under the control of the control apparatus 6) may analyse the image to detect candidate characters of the printed code 4. A candidate character may be a set of connected pixels which has been determined to have certain characteristics defined by the set of character identification parameters. When a set of connected pixels meets these character identification parameters, the printed code inspection system 1 may determine that the set of connected pixels is likely to be a character, and will identify the set of connected pixels as a candidate character accordingly.

The printed code inspection system 1 may detect candidate characters by detecting sets of connected pixels. A set of connected pixels may be any two or more adjacent pixels which share a common or similar characteristic. For instance, any pixels touching a corner or edge of other pixels having matching or similar values may be grouped into a set.

Once the sets of connected pixels have been identified, the printed code inspection system 1 may determine the number of pixels in each set of connected pixels, the elongation of each set of connected pixels, and/or the compactness of each set of connected pixels. The elongation may indicate how elongated a shape is and may be determined as being the ratio of the length to the width of the shapes bounding box. The compactness may indicate how compact a shape is. The compactness of a shape may be determined as:

$$C = \frac{4\pi A}{L^2}$$

where C is the compactness, A is the area of the shape, and L is the perimeter of the shape. The printed code inspection system 1 may then determine whether each set of connected pixels is a candidate character based on a comparison of any of the determined values (i.e. number of pixels, compactness and elongation) with the corresponding character identification parameter.

For instance, the printed code inspection system 1 may compare the determined number of pixels of each set of connected pixels with one or more parameters indicative of a number of pixels, which may be a range of permissible values. If the determined number of pixels falls within the range of permissible values defined by the one or more parameter indicative of a number of pixels, the printed code inspection system 1 may identify the set of connected pixels as a candidate character. For instance, as mentioned above, the parameters may define a high threshold number of pixels and a low threshold number of pixels with the range of permissible values being any value between the high and low thresholds. A similar process may be applied for the one or more parameters indicative of elongation and the one or more parameters indicative of compactness.

The printed code inspection system 1 may require the set of connected pixels to meet all or any combination of the criteria relating to the number of connected pixels, the elongation, and the compactness. For instance, all, any two, or just one of the criteria may need to be satisfied in order to determine a set of connected pixels as a candidate character.

Whilst in the above description it is only mentioned that the printed code inspection system may consider the number of connected pixels, the elongation of the set of connected pixels, and the compactness of the set of connected pixels, the printed code inspection system 1 may consider other parameters of the set of connected pixels. For instance, the printed code inspection system may consider, in addition or alternatively, a height and/or a width of the set of connected pixels.

As also discussed above, in operation 2.5, the printed code inspection system 1 (e.g. under the control of the control apparatus 6) may determine which of the candidate characters are likely to be characters of the printed code 4. The printed code inspection system 1 may therefore selectively determine which of the sets of connected pixels are to be subject to further analysis. As such, the number of comparisons (and thus operations) made by the printed code inspection system 1 may be reduced.

In some examples, the printed code inspection system 1 may determine a principal axis of each candidate character. For instance, the principal axis may be determined based on an orientation and a length of a major axis determined using region moments. The printed code inspection system 1 may determine a skew angle of each candidate character. The skew angle may be determined as the angle between the principal axis of a candidate character and the y axis of the image.

The printed code inspection system 1 may generate a bounding box around each candidate character. The bounding box may be a box with the smallest area which would fully enclose a candidate character. The printed code inspection system 1 may determine the area and/or dimensions of the bounding box. The character height and/or character width of a candidate character may be determined based on the dimensions of the bounding box of the candidate character.

The printed code inspection system 1 may determine whether each candidate character is likely to be one of the printed characters of the printed code 4 based on a comparison of any or all of these determined values (i.e. skew angle, bounding box area and/or bounding box dimensions) with the corresponding candidate character properties. In some other examples, the printed code inspection system 1 may additionally or alternatively determine whether a candidate character is likely to be one of the printed characters of the printed code 4 based on a comparison of one or both of the determined values with the value(s) determined for (an)other candidate character(s). For instance, the system may require that only those characters having a relative skew angle within a particular range are likely to be printed characters of the printed code 4. Put another way, the system may require all characters that are likely to be printed characters of the printed code 4 have a similar skew angle (or bounding box area/dimensions).

For instance, the printed code inspection system 1 may compare the determined skew angle of each candidate character with one or more properties indicative of a skew angle, which may be a range of permissible values. If the determined skew angle falls within the range of permissible values defined by the one or more properties indicative of a skew angle, the printed code inspection system 1 may identify the candidate character as being likely as being one of the printed characters of the printed code 4.

In addition or alternatively, the printed code inspection system 1 may compare the determined bounding box area of each candidate character with one or more properties indicative of a bounding box area, which may be a range of permissible values. If the determined bounding box area falls within the range of permissible values defined by the one or more properties indicative of a bounding box area, the printed code inspection system 1 may identify the candidate character as being likely as being one of the printed characters of the printed code 4.

The printed code inspection system 1 may require the candidate characters to meet all or any combination of the criteria relating to the skew angle and bounding box area. For instance, all, or either one of the criteria may need to be satisfied in order to determine which of the candidate characters are likely to be printed characters of the printed code 4.

Whilst in the above description it is only mentioned that the printed code inspection system 1 may consider the skew angle and the bounding box area of the candidate characters, the printed code inspection system 1 may consider other properties of the candidate characters.

In operation 2.6, the printed code inspection system 1 may determine, based on the candidate characters determined as being likely to be one of the printed characters of the printed code 4, whether the printed code 4 is present and legible. This determination may be based on, for instance, the number, locations and/or dimensions of the candidate characters determined as being likely to be one of the printed characters of the printed code 4. For instance, if the printed code inspection system 1 determines that an appropriate number of printed characters have been identified and have appropriate relative locations and/or dimensions, it may be determined that the printed code 4 is present and legible.

In some examples, the printed code inspection system 1 may determine dimensions and/or locations of a print box based on the candidate characters determined to be likely to be printed characters of the printed code 4. The print box may be an area encompassing each candidate character determined to be likely to be a character of the printed code 4. The print box may be determined, for instance, based on the dimensions and locations of the candidate characters determined as being likely to be printed characters of the printed code 4. The printed code inspection system 1 may determine whether the printed code 4 is present and legible based on the print box. For instance, the size, shape or orientation of the print box may be used to determine whether the printed code 4 is present and legible.

In some examples, the determination of whether the printed code 4 is present and legible may be based at least in part on a detection of a graphic (e.g. a piece of artwork)

in the received image which does not form part of the printed code. The printed code inspection system 1 may detect the graphic by applying an edge detection filter across the received image to detect edges in the received image and attempting to match detected edges in the image with a known set of edges corresponding to the graphic. Although one particular method of detecting the graphic is described, it will be appreciated that there are many ways in which this could be done. The printed code inspection system 1 may also require the graphic to be in a particular, expected orientation in the image in order to be deemed to be detected. The graphic may form at least part of an artwork applied to the object 3. The detection of the graphic (at a particular location/orientation relative to the printed code) may indicate that the printed code 4 has been applied to the correct region of the object 3 and/or that the printed code 4 is in the correct orientation relative to the object 3. Parameters for detecting the graphic may be user configurable independently of the configuration settings for detecting the printed code 4. They may however be stored in association with the configuration settings for detecting the printed code 4.

In many implementations, verification by the printed code inspection system 1 that the printed code 4 is present and legible may be sufficient. However, although not shown in FIG. 2 and as discussed above, in some examples the printed code inspection system 1 may perform OCR. The printed code inspection system 1 may perform OCR only on one or more regions of the image in which the candidate characters determined as being likely to be printed characters of the printed code 4 are located. In some examples, the printed code inspection system 1 may convert pixels contained by the candidate characters determined as being likely to be printed characters of the printed code 4 into text characters using OCR. The printed code inspection system 1 may determine whether the printed code 4 is correct based on the recognised text characters. As mentioned previously, by performing OCR only in respect of the characters identified as being likely to be characters of the printed code 4 (and not on the remainder of the image) the computational overhead associated with performance of OCR may be significantly reduced.

In addition or alternatively, the parameters used to configure the OCR to be performed for a particular candidate character determined as being likely to be a character of the printed code may be dynamically updated based on one or more determined values of the particular candidate character determined as being likely to be a character of the printed code. For instance, the area and/or dimensions of the bounding box determined for the particular candidate character may be used. Furthermore, the parameters used to configure the OCR may additionally or alternatively be determined based on a user indication of at least one of: a type of font used in the printed code 4, a printing or marking technology used to print the printed code 4, and the presence of a noisy background. In this way, the printed code inspection system may provide reliability and speed improvements in the performance of OCR.

In operation 2.7, the printed code inspection system 1 may output an indication as to whether the printed code 4 is present and legible. In some examples where the printed code inspection system 1 determines whether the printed code 4 is correct, the printed code inspection system 1 may output an indication as to whether the printed code 4 is correct.

The printed code inspection system 1 may output the indication as to whether the printed code 4 is present and legible (and, in some examples, correct) to the production line apparatus 9. In some such examples, the printed code inspection system 1 may control the production line apparatus 9 to redirect objects 3 in response to the indication being received. Additionally or alternatively, the printed code inspection system 1 may control the production line apparatus 9 to provide an alert, e.g. to a human operator, when the indication is received.

Figure 5:
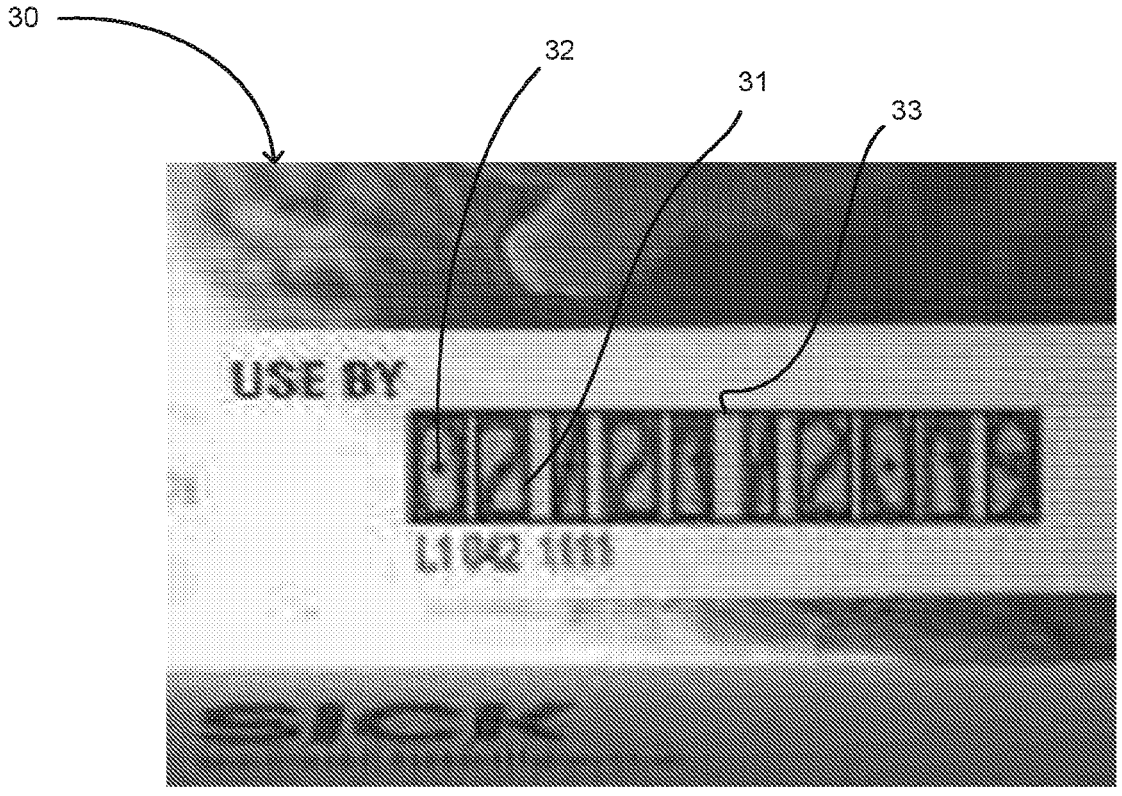
FIG. 5 illustrates an example of a processed image which may be generated by the printed code inspection system illustrated by FIG. 1.

In some examples, the printed code inspection system 1 may generate a processed image. This may be performed as well as or instead of providing the indication to the production line apparatus 9. The processed image may be similar to that illustrated in FIG. 5. The processed image 30 may include a number of indications overlaid on the received image. For instance, the processed image 30 may include an indication of locations 31 of each candidate character which has been determined as being likely to be a character of the printed code 4, an indication of locations of each candidate character 32, and/or an indication of a determined print box 33. The indication of locations of the candidate characters determined to be likely to be printed characters may include, for instance, a bounding box 31. The indication of locations of each detected candidate character may include, for instance a dot 32 at a determined "centre of gravity" of the candidate character. The dimensions of the print box 33 may include a predetermined margin so that it can be distinguished from the bounding boxes 31 in the processed image 30. Put another way, the print box 33 may be larger than the combined area of the bounding boxes 31.

In some examples, the location of all of the candidate characters, including those which are not determined to be likely to be printed characters, may be indicated in the processed image 30. In these examples, the indication of the location may have a colour corresponding to the classification of the candidate character. For instance, indications of locations of candidate characters which are determined to be likely to be printed characters may be coloured green, indications of locations of candidate characters which are not determined to be likely to be printed characters may be coloured red, and indications of locations of candidate characters for which a determination as to whether they are likely to be printed characters has not been made may be coloured orange. Such indications of locations may be, for instance, bounding boxes and/or a dot at a determined "centre of gravity" of the candidate character.

The printed code inspection system 1 may output the indication as to whether the printed code 4 is present and legible (and, in some examples, correct) to the one or more displays 7. The printed code inspection system 1 may provide the captured image and/or the processed image 30 for display on the one or more displays 7. The one or more displays 7 may display an alert to a user, e.g. a message or an image, in response to the indication being received from the printed code inspection system 1. The alert may, for instance, indicate that a printed code 4 which is not present, legible and/or correct has been identified.

Operation of a printed code inspection system 1, for instance, as has been described above with reference to FIGS. 1 and 2, will now be described in more detail in relation to the flow chart of FIG. 3. The operations depicted in FIG. 3 may be performed prior to those illustrated in FIG. 2. As will be appreciated, in some examples some of the operations depicted in FIG. 3 may be omitted. Also, in some examples, the operations of FIG. 2 may be performed without some or all of the operations of FIG. 3 having been performed.

In some examples, the printed code inspection system 1 may control the camera device 2 to capture a "previous"

image of a previous object 3. The previous image may refer to an image which is captured prior to the operations described in relation to FIG. 2. The previous object 3 may be of the same form as the object 3 captured in the image received in operation 2.1 of FIG. 2. The previous image of the previous object 3 may therefore be similar to the image received in operation 2.1 of FIG. 2. It may include a printed code 4 which has been applied to the previous object 3. The previous image may, similarly to the image received in operation 2.1 of FIG. 2, also include a number of characters and graphics applied to the previous object 3 which do not form part of the printed code 4.

In operation 3.1, the printed code inspection system 1 may receive the previous image.

In operation 3.2, the printed code inspection system 1 may detect candidate characters of the printed code 4 in the previous image. This operation may be similar to operation 2.4 of FIG. 2 described above and so will not be described in detail here. However, in operation 3.2, the character identification parameters used to detect candidate characters in the previous image may be initial character identification parameters, which may not be the case in operation 2.4. The initial character identification parameters may be set to be permissive so as to allow a large number of candidate characters to be detected. For instance, the initial character identification parameters may include a range of permissible values which may be relatively large compared to a range of permissible values included in the character identification parameters used in operation 2.4. In this way, more of the identified sets of connected pixels will be identified as candidate characters. This may ensure that the system does not inadvertently miss one or more of the characters of the printed code.

In operation 3.3, the one or more displays 7 may display the previous image received from the printed code inspection system 1. The one or more displays 7 may display an indication, received from the printed code inspection system 1, of the location of each detected candidate character. The indications may be overlaid over the previous image. In some examples, the indication of the location of each detected candidate character may be a dot positioned at a determined "centre of gravity" of the detected candidate character. In addition or alternatively, the indication may include a bounding box of the detected candidate character.

Figure 6:
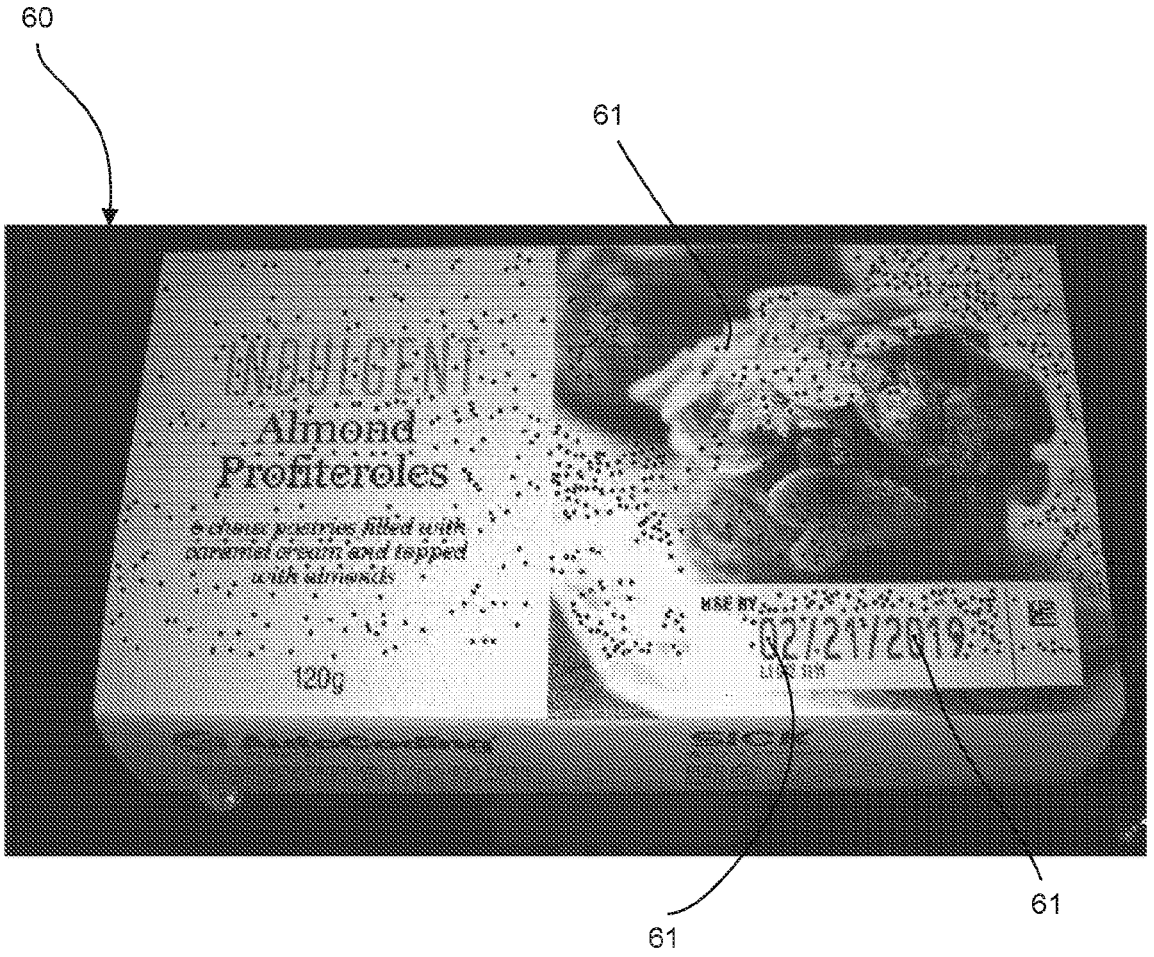
FIG. 6 illustrates an example of a previous image including indications of locations of candidate characters.

FIG. 6 illustrates an example of a processed previous image 60 including indications of locations 61 of all candidate characters. Such an image 60 may be displayed to a user to enable the user to indicate which of the candidate characters are characters of the printed code.

In operation 3.4, the printed code inspection system 1 may receive, from the user input interface 8, a user indication of candidate characters which the user identifies as being characters of the printed code 4. In addition or alternatively, the printed code inspection system 1 may receive, from the user input interface 8, a user indication of candidate characters which are not characters of the printed code 4. Either way, printed code inspection system 1 may be able to infer from the user indication(s) as to which candidate characters correspond to characters of the printed code 4. In some examples, the printed code inspection system 1 may determine that each candidate character which is not positively indicated is not a character of the printed code 4. In some examples, the user indications may indicate an individual candidate character. In other examples, the user indication may indicate an area containing one or more candidate characters, with all candidate characters within that area being indicated to be characters of the printed code 4 (or not characters of the printed code 4).

Figure 2:
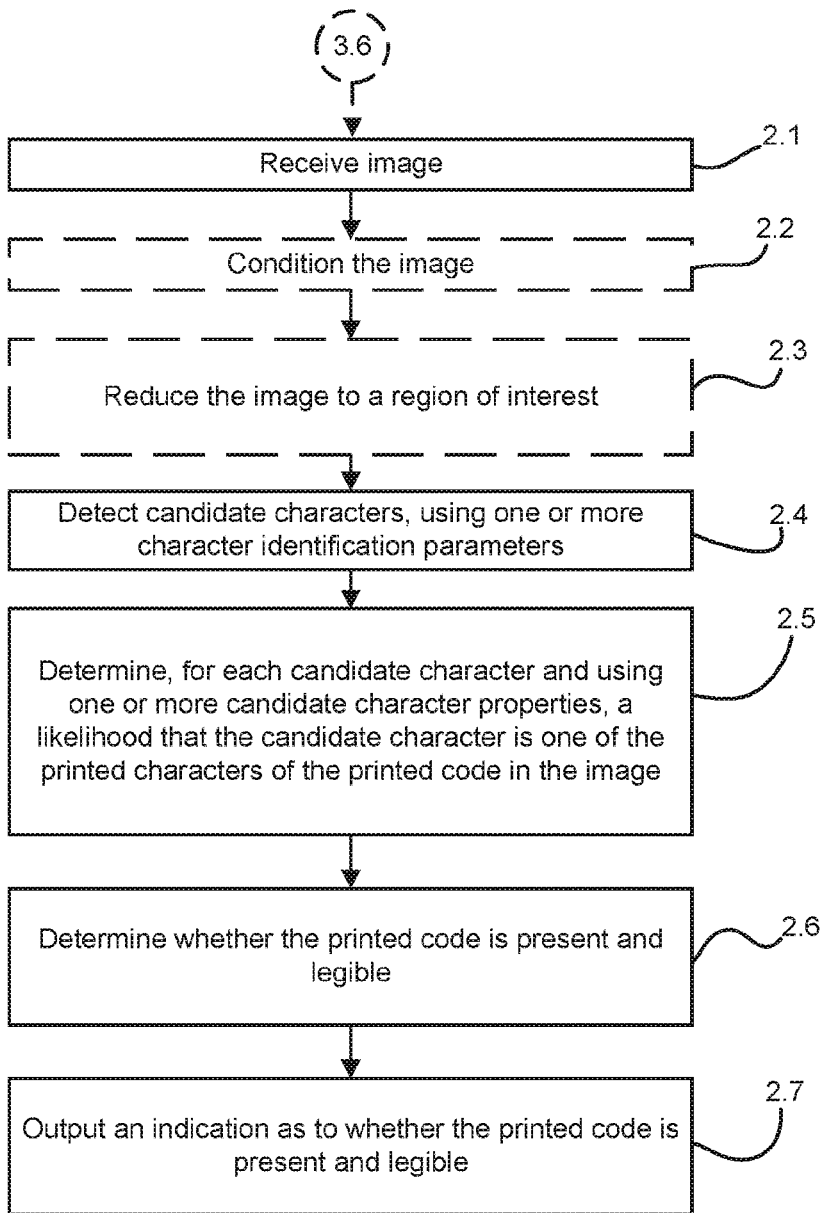
FIGS. 2 to 4 are flow charts illustrating various example operations which may be performed by the printed code inspection system illustrated by FIG. 1.
Figure 3:
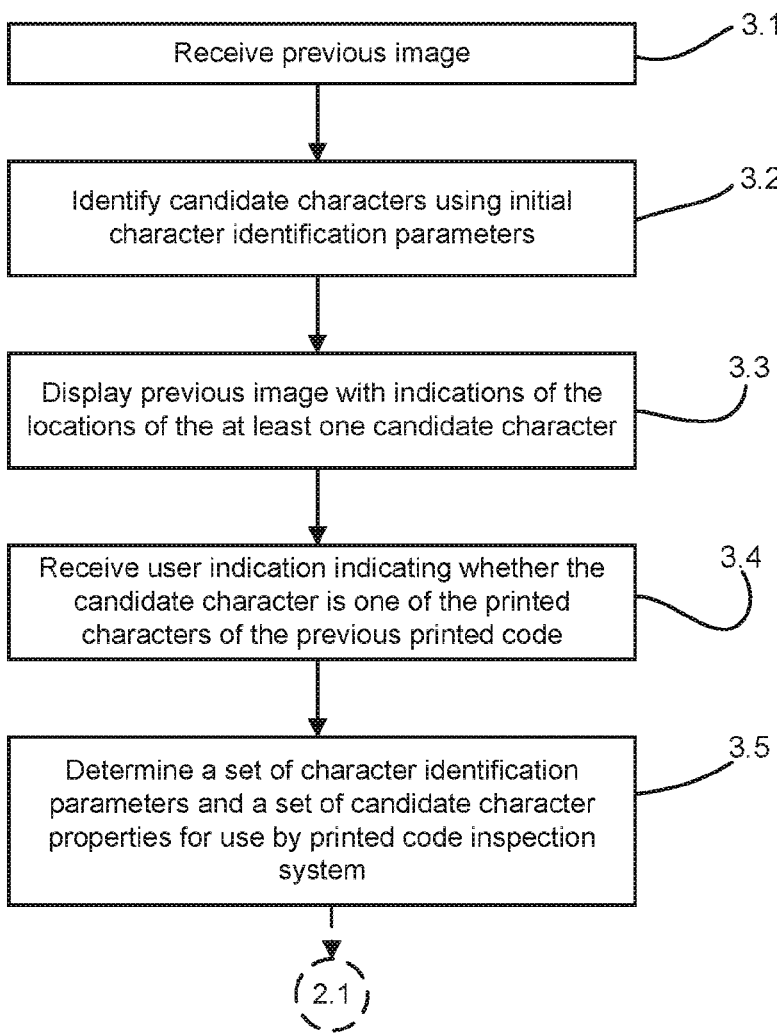

In operation 3.5, the printed code inspection system 1 may determine the set of character identification parameters and/or the set of candidate character properties for use in operations 2.4 and 2.5 described in relation to FIG. 2, based on the candidate characters which have been indicated as being characters of the printed code 4. For instance, the set of character identification parameters and/or the set of candidate character properties may be determined based on maximum and minimum values found for corresponding parameters and/or properties of the candidate characters indicated as being characters of the printed code 4.

In addition or alternatively, the printed code inspection system 1 may determine the set of character identification parameters and/or the set of candidate character properties on the basis of the candidate characters which have been indicated to not be printed characters of the printed code 4.

In an example, the set of character identification parameters and/or the set of candidate character properties may include a high threshold and a low threshold for a given value (e.g. compactness).

The printed code inspection system 1 may determine a value of the high threshold based on a comparison of a corresponding maximum value found among the candidate characters indicated to be characters of the printed code 4 and a corresponding minimum value found among candidate characters indicated to not be characters of the printed code 4. For instance, if the maximum value found among the candidate characters indicated to be characters of the printed code 4 is greater than the minimum value found among candidate characters indicated to not be characters of the printed code 4, the value of the high threshold may be determined to be the maximum value found among the candidate characters indicated to be characters of the printed code 4. The value of the high threshold may additionally include a margin such that it may be slightly larger than the maximum value found among the candidate characters indicated to be characters of the printed code 4. If the maximum value found among the candidate characters indicated to be characters of the printed code 4 is not greater than the minimum value found among candidate characters indicated to not be characters of the printed code 4, the value of the high threshold may be determined to be a mid-point (e.g. a mean or median) of these two values.

The printed code inspection system 1 may determine a value of the low threshold based on a comparison between a corresponding minimum value found among the candidate characters indicated to be characters of the printed code 4 and a corresponding maximum value found among candidate characters indicated to not be characters of the printed code 4. For instance, if the minimum value found among the candidate characters indicated to be characters of the printed code 4 is less than the maximum value found among candidate characters indicated to not be characters of the printed code 4, the value of the low threshold may be determined to be the minimum value found among the candidate characters indicated to be characters of the printed code 4. The value of the low threshold may additionally include a margin such that it may be slightly less than the minimum value found among the candidate characters indicated to be characters of the printed code 4. If the minimum value found among the candidate characters indicated to be characters of the printed code 4 is not less than the maximum value found among candidate characters indicated to not be characters of the printed code 4, the value of the low threshold may be determined to be a mid-point of these two values.

In another example, the set of character identification parameters and/or the set of candidate character properties may include a single threshold for a given value. The printed code inspection system 1 may determine a value of the single threshold based on a determination of whether the values of the candidate characters indicated as being characters of the printed code 4 corresponding to the single threshold are generally higher or lower than the corresponding values of the candidate characters indicated as not being characters of the printed code 4. This determination may be made based on the number of candidate characters indicated as not being characters of the printed code 4 which have a value higher than the corresponding maximum value found among the candidate characters indicated to be characters of the printed code 4, and the number of the candidate characters indicated as not being characters of the printed code 4 which have a value lower than the corresponding minimum value found among the candidate characters indicated to be characters of the printed code 4. If the printed code inspection system 1 determines that the values of the candidate characters indicated as being characters of the printed code 4 corresponding to the single threshold are generally higher than the corresponding values of the candidate characters indicated as not being characters of the printed code 4, the threshold may be considered to be a low threshold, and determined as described above. If the printed code inspection system 1 determines that the corresponding values of the candidate characters indicated as being characters of the printed code 4 are generally lower than the corresponding values of the candidate characters indicated as not being characters of the printed code 4, the threshold may be considered to be a high threshold, and determined as described above.

As such, the printed code inspection system 1 may determine values for the set of character identification parameters and/or the set of candidate character properties which encompass all of the candidate characters indicated to be characters of the printed code 4, and in some examples provide flexibility such that characters of the printed code 4 present in other images, which may differ from the previous image, may be reliably detected. In some examples, the printed code inspection system 1 may determine values for the set of character identification parameters and/or the set of candidate character properties such that candidate characters which are not characters of the printed code 4 may be excluded.

After the set of character identification parameters and/or the set of candidate character properties have been determined, the method may proceed to operation 2.1 of FIG. 2.

By determining the set of character identification parameters and/or the set of candidate character properties through the provision of an image in which the user can indicate which candidate characters are printed characters, the printed code inspection system 1 may provide an efficient and accurate way to configure the printed code inspection system 1 for a specific type of printed code 4, without requiring prior knowledge of the characteristics of the printed code 4. Indeed, it may constitute a guided human-machine interaction process for assisting the user in the technical task of configuring the printed code inspection system 1.

Figure 4:
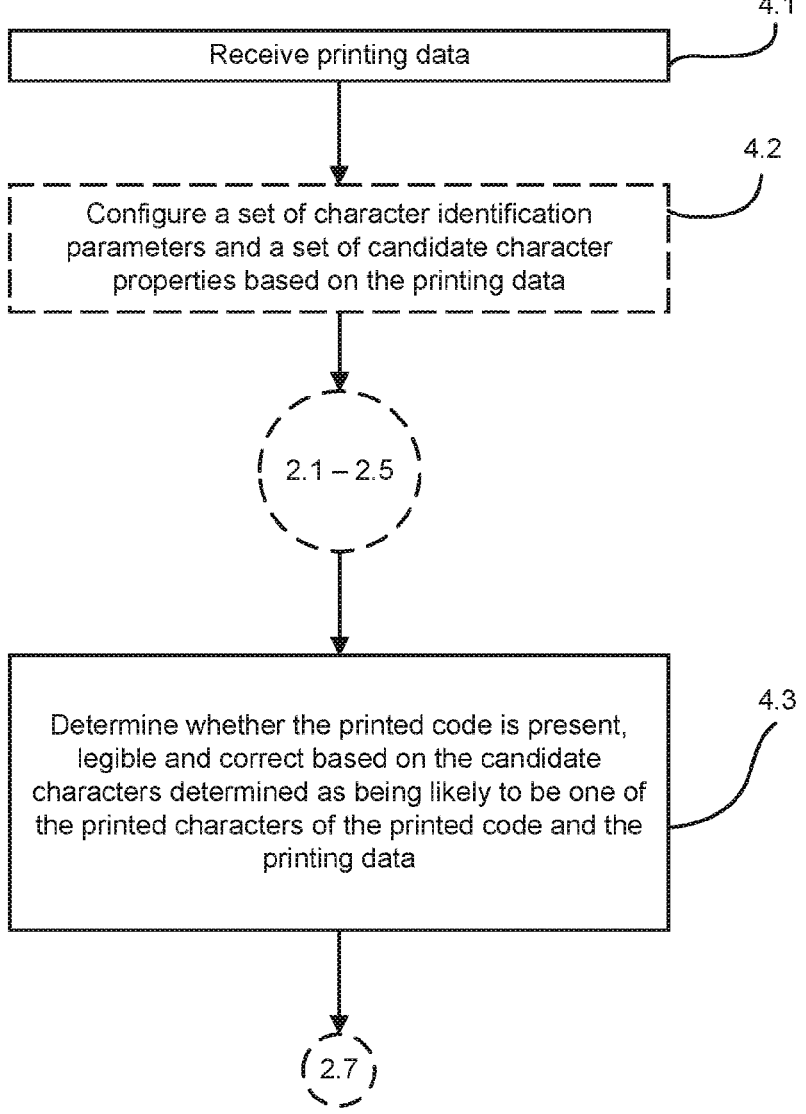

As is illustrated in the flow chart of FIG. 4, the printed code inspection system 1, for instance as has been described above with reference to FIGS. 1, 2 and 3 may in some examples be operable to receive and utilise printing data associated with the printed code 4 for configuring the printed code inspection system 1. As will be appreciated, in some examples some of the operations depicted in FIG. 4 may be omitted. Also, in some examples, the operations of FIG. 2 and/or FIG. 3 may be performed without some or all of the operations of FIG. 4 having been performed.

In operation 4.1, the printed code inspection system 1 may receive printing data associated with the printed code 4. In some examples, the printing data may be received from the coding device 5 (or a device associated with the coding device 5). In other examples, the user may provide the printing data to the printed code inspection system 1, for instance, via the user input interface. In yet other examples, the printed code inspection system 1 may receive the printing data from a server (not shown). The printing data may be received when the printed code inspection system 1 is first initialised. In addition or alternatively, the printing data may be received in response, or otherwise following, a change in the configuration or format of the printed code 4 that is being applied to objects which are to be inspected by the printed code inspection system 1.

The printing data may include an expected format of the printed code 4. The expected format may include one or any combination of: an indication of a character size of the printed characters in the printed code 4, a number of characters in the printed code 4, a number of rows and/or columns in the printed code 4, and/or a number of characters in each row and/or column of the printed code 4.

The printing data may include an expected content of the printed code 4. The expected content may include an indication as to whether the printed code 4 includes one or any combination of a fixed element, a variable element, a counter element, and a real time clock element. A fixed element may be any element in the printed code 4 which should remain fixed each time the printed code 4 is applied to a different object 3, such as one or any combination of an object code, an object name, and other object-related information (e.g. allergen information or safety information). A variable element may be any element which might vary when the printed code 4 is applied to a different object 3, such as a unique identification code, or an expiry date. A counter element may be, for instance, a number or letter which increases or decreases as the printed code 4 is applied to different objects 3, such as a counter of the number of objects 3 processed. A real time clock element may be, for instance, a time that the printed code 4 is applied or a date that the printed code 4 is applied.

The printing data may also or alternatively include one, or any combination of: a configuration of the coding device 5 (e.g. the printing technology used), current date information, current time information, a number of printed codes 4 to be (or which have been) printed, and an expected print box size.

In some examples, the printed code inspection system 1 may keep a log of data during operation. The data which is logged during operation may include at least one of the set of character identification parameters, the set of candidate character properties, the printing data, the results of the operation, and the duration of operation. In some further examples, the printed code inspection system 1 may start a new log of data based on a detected change in the received printing data. For instance, the printed code inspection system 1 may start a new log of data when the printing data indicates that at least one counter element is reset. This may be useful, for instance, for evaluating performance of the system.

In operation 4.2, the printed code inspection system 1 may determine the set of character identification parameters and the set of candidate character properties based on the printing data. For instance, the printed code inspection system 1 may determine one or more candidate character properties indicative of a size of a bounding box based on the expected size of characters indicated in the expected format. In addition or alternatively, the printed code inspection system 1 may utilise the printing data when determining parameters for use in conditioning the images (e.g. as described in operation 2.2 of FIG. 2). For instance, a configuration of the coding device 5 (e.g. whether the coding device 5 is an ink jet printer) may be used to determine the parameters of the median and/or binarization filter.

As mentioned above, the printed code inspection system 1 may perform operations 2.1 to 2.5 described with reference to FIG. 2 using the set of candidate character properties determined in operation 4.2. In some examples, operation 4.2 may be omitted such that the printed code inspection system 1 does not determine the set of character identification parameters and the set of candidate character properties based on the printing data.

In operation 4.3, the printed code inspection system 1 may determine whether the printed code 4 is present and legible based on the candidate characters determined to be likely to be printed characters of the printed code 4 and the printing data.

In some examples, the printed code inspection system 1 may determine that the printed code 4 is present and legible based on a comparison of a format of the candidate characters determined to be likely to be printed characters and an expected format, e.g. as defined by the printing data. For instance, the printed code inspection system 1 may determine that the printed code 4 is present and legible when the number of candidate characters determined to be likely to be printed characters of the printed code 4 is the same or similar as the expected number of characters from the expected format as defined by the printing data.

In some examples, the printed code inspection system 1 may determine that the printed code 4 is present and legible when the determined print box size is the same or similar to (e.g. within an acceptable deviation from) the expected print box size.

In some examples, the printed code inspection system 1 may generate a match string based on the expected content in the received printing data. The match string may be a series of characters approximately equivalent to the expected content. The printed code inspection system 1 may insert wildcard characters into the match string based on the expected content. For instance, when the printed code inspection system 1 determines that the expected content includes a variable element, the printed code inspection system 1 may replace characters representing the variable element with wildcard characters in the match string. The wildcard characters may be interpreted as representing a number of different characters.

In some examples in which the printed code inspection system 1 has converted the candidate characters determined to be likely to be printed characters of the printed code 4 into text characters using OCR, the printed code inspection system 1 may determine whether the printed code 4 is correct based on a comparison of the match string with the recognised text characters. For instance, if the recognised text characters include the same characters in the same order as the series of characters of the match string, the printed code inspection system 1 may determine that the printed code 4 is correct. When the match string contains wildcard characters, the printed code inspection system 1 may determine that the printed code 4 is correct even when the recognised text character is not the same as the corresponding wildcard character in the match string.

The printed code inspection system 1 may determine e.g. based on the printing data whether the expected content includes a real time clock element. In the event that it is determined that the printed code 4 includes a real time clock element, the printed code inspection system 1 may use wildcard characters to determine whether the printed code 4 matches the expected content. In some examples, the printed code inspection system 1 may also determine whether the time indicated by the clock element in the printed code 4 is correct. In such examples, the printed code inspection system 1 may determine whether the real-time clock element of the printed code 4 is within an acceptable tolerance of an expected time. For instance, the printed code inspection system 1 may determine that the printed code 4 is correct when the recognised text characters of the real-time clock element represent a time which is within the acceptable tolerance of an expected time. For instance, if the acceptable tolerance is configured to be 2 minutes, the printed code inspection system 1 may determine that the printed code 4 is correct when the recognised text characters represent a time which is within 2 minutes of the an expected time. The expected time may be determined based on an internal clock of the printed code inspection system 1 and/or based on information received from the coding device 5. In some examples, the expected time may be a current time. In some examples, the acceptable tolerance may be configurable. For instance, the acceptable tolerance may be based on a distance between the coding device 5 and the camera device 2. In addition or alternatively, the acceptable tolerance may be based on a rate of movement of the object 3 caused by the production line apparatus 9.

The printed code inspection system 1 may cause the one or more displays 7 to display one or any combination of: the print count, the number of printed codes 4 which have been inspected, the number of printed codes 4 which are present and legible (and in some examples, correct) and the number of printed codes 4 which are not present and legible (and in some examples, correct).

Whilst the elements depicted in FIG. 1 may have been described as being separate, in some examples one or more of these elements may be combined. For instance, as mentioned above, the control apparatus 6 may be combined with the camera device 2. Similarly, in some examples, the printed code inspection system 1 (or just the camera device 2) may be integrated with the coding device 5 and/or the production line apparatus 9. Furthermore, whilst operations may have been described, e.g. with reference to FIGS. 2 to 4, as occurring within a single element, the operations may be distributed across multiple elements.

Figure 7:
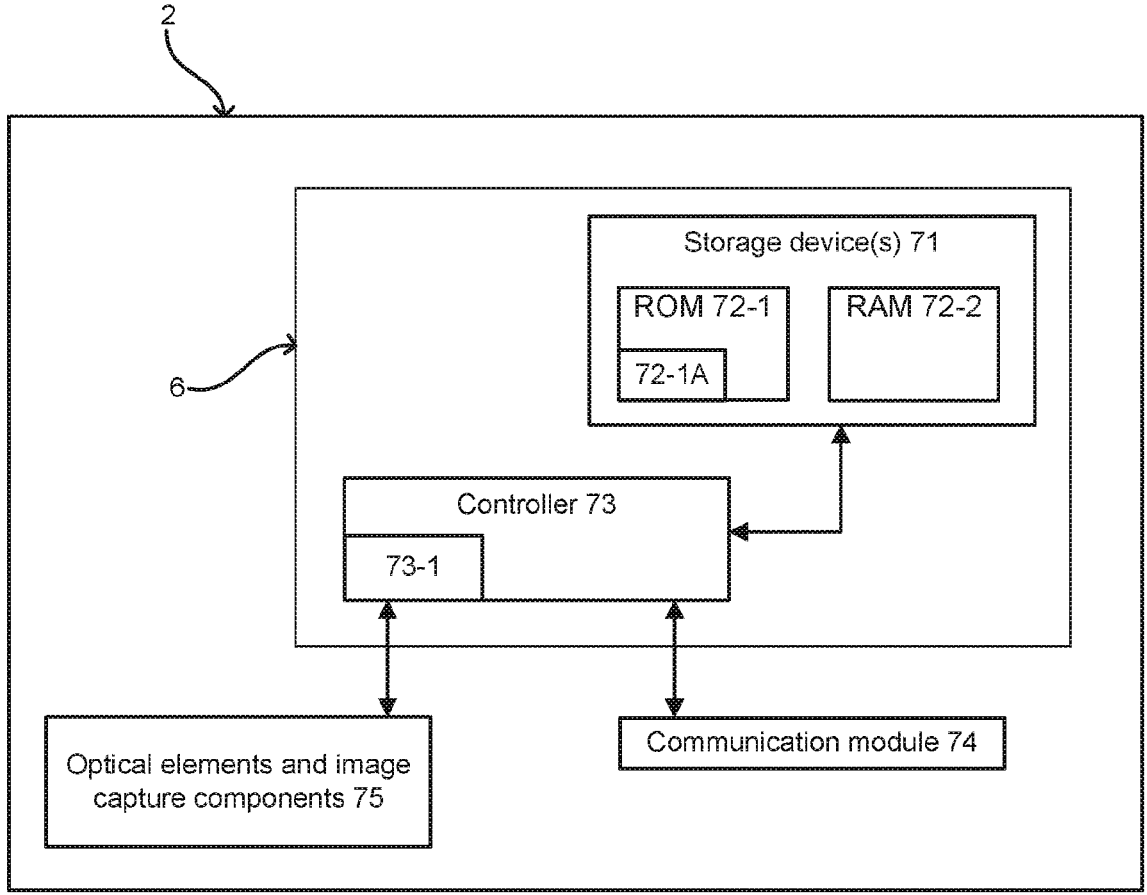
FIG. 7 is a schematic illustration of an example configuration of a camera device which may be utilised to provide the functionalities described with reference to FIGS. 2 to 4.

FIG. 7 is a block diagram illustrating the camera device 2, which may form part of, or constitute, the printed code inspection system 1 illustrated in FIG. 1. The camera device 2 may include one or more storage devices 71 and a controller 73. The storage devices 71 may store one or more computer instructions 72, which when read by the controller 73 of the camera device 2, cause the camera device 2 to perform the operations described above in relation to FIGS. 2 to 4. In some examples, the one or more storage devices 71 and a controller 73 may form the control apparatus 6 described above, e.g. with reference to FIG. 1.

The camera device 2 may include a communication module 74. The communication module 74 may be controlled by the controller 73 to communicate with one or more external devices, such as a coding device 5, a server, a production line apparatus 9, another camera device 2, an external control apparatus 6, another printed code inspection system 1, a display 7 and/or a user input interface 8. The communication may be performed by any means, such as by wired communication or by any form of wireless technology.

The camera device 2 may include one or more optical elements and image capture components (e.g. CCDs etc.) 75. The optical elements 75 may be controlled by the controller 73 to capture an image. In some examples, the optical elements 75 may be configured to cause the captured image to be smoothed. For instance, the optical elements 75 may include a soft-focus lens or an out-of-focus lens. As such, the camera device 2 may provide a smoothed image for processing by the printed code inspection system 1. This may be beneficial for particular types of coding technologies where the printed characters are formed of groups of separate elements (such as dots). Furthermore, it may negate the need for one or more of the above described image conditioning techniques (such as a median filter). As such, the printed code inspection system 1 may have an improved speed of operation and a reduced computational power requirement.

The camera device 2 may further include at least one removable storage device. The at least one removable image storage device may be, for instance, an SD card. In some examples, the printed code inspection system 1 can be configured to store received images and/or processed images on the at least one removable image storage device. The storing of images on the removable image storage device may be conditional on at least one criteria, for instance, the printed code inspection system may be configured to only store images on the removable image storage device when the corresponding received image is (or is not) determined to include a printed code which is present and legible. The extent of additional information stored with an image may also be configured. For instance, the printed code inspection system 1 may be configured (e.g. based on a user-specified criteria) to only store indications of the location of candidate characters with the processed image. The printed code inspection system 1 may also be configured to delete images on the removable image storage device when the images are, for instance, older than a threshold age and/or when the removable storage device is storing more than a threshold number of images.

As mentioned previously, the camera device 2 may further include at least one dedicated hardware device (e.g. an on-board FPGA) which is capable of performing median filtering using a particular median filter kernel size (e.g. a median filter kernel size of 3×3 pixels). When the median filter kernel size selected corresponds to the particular median filter kernel size of the dedicated hardware device of the camera device 2, the dedicated hardware device of the camera device 2 may perform the median filtering of the image. In this way, the performance of the median filtering may be much faster.

As will be appreciated from the above description, the printed code inspection system 1 may not require the use of OCR. As such the printed code inspection system 1 may have an improved speed of operation and a reduced computational power requirement. The improved speed of operation may be particularly beneficial when the printed code inspection system 1 is used with a production line, in which the printed code inspection system 1 may be required to inspect the printed code 4 of (approximately) two objects per second. The printed code inspection system 1 may also not require a search region to be specified. As such, the printed code inspection system 1 may require less up-front configuration, and so a set up time during which the printed code inspection system 1 is not operational, can be reduced. In addition, the printed code inspection system 1 may not require pre-training. As such, time and computational resources to collect training data and to perform pre-training can be eliminated.

In some examples, when the printed code inspection system 1 does perform OCR, the printed code inspection may perform OCR only in respect of the characters identified as being likely to be characters of the printed code 4 (and not on the remainder of the image). As such, the computational overhead associated with performance of OCR may be significantly reduced. In addition, the printed code inspection system 1 may determine (e.g. based on received printing data) when the printed code 4 includes one or more elements which are not fixed. As such, the printed code inspection may eliminate the need for a user to identify in advance those areas of the images which will include elements which are not fixed. Again this may reduce the set-up time associated with the printed code inspection system 1. In addition, by eliminating the need to identify regions of the images in advance, the printed code inspection system 1 may have improved tolerance to misalignment of the objects passing by the camera device and/or a reduced need to rectify the captured images.

In addition, in examples in which the printed code inspection system 1 receives printing data from the coding device 5 (or otherwise), the printed code inspection system 1 may not require independent setup each time the printed code 4 is changed. As such, the printed code inspection system 1 may have a reduced downtime during which the printed code inspection system 1 cannot be used.

Some further details of components and features of the above-described systems 1 and apparatuses 2, 6 and alternatives for them will now be described.

The control apparatus 6 described above may comprise a controller 73, which may itself comprise processing apparatus 63-1 communicatively coupled with one or more storage devices 71. The storage device(s) 71 has computer readable instructions 72-1A stored thereon which, when executed by the processing apparatus 63-1 causes the control apparatus 6 to cause performance of various ones of the operations described with reference to FIGS. 1 to 7. The control apparatus 6 may, in some instances, be referred to as simply "apparatus". As illustrated in FIG. 7, in some implementations, the control apparatus 6 may be integrated with the camera device 2.

The processing apparatus 63-1 may be of any suitable composition and may include one or more processors of any suitable type or suitable combination of types. Indeed, the term "processing apparatus" should be understood to encompass computers having differing architectures such as single/multi-processor architectures and sequencers/parallel architectures. For example, the processing apparatus 63-1 may be a programmable processor that interprets computer program instructions 72-1A and processes data. The processing apparatus 63-1 may include plural programmable processors. Alternatively, the processing apparatus 502 may be, for example, programmable hardware with embedded firmware. The processing apparatus 502 may alternatively or additionally include one or more specialised circuit such as field programmable gate arrays FPGA, Application Specific Integrated Circuits (ASICs), signal processing devices etc. In some instances, processing apparatus 502 may be referred to as computing apparatus or processing means.

The processing apparatus 63-1 is coupled to the storage device(s) 71 and is operable to read/write data to/from the storage device(s) 71. The storage device(s) 71 may comprise a single memory unit or a plurality of memory units, upon which the computer readable instructions (or code) 72-1A is stored. For example, the storage device(s) 71 may comprise both volatile memory 72-2 and non-volatile memory 72-1. In such examples, the computer readable instructions/program code 72-1A may be stored in the non-volatile memory 72-1 and may be executed by the processing apparatus 63-1 using the volatile memory 72-2 for temporary storage of data or data and instructions. Examples of volatile memory include RAM, DRAM, and SDRAM etc. Examples of non-volatile memory include ROM, PROM, EEPROM, flash memory, optical storage, magnetic storage, etc.

The storage device(s) 71 may be referred to as one or more non-transitory computer readable memory medium. Further, the term 'memory', in addition to covering memory comprising both one or more non-volatile memory and one or more volatile memory, may also cover one or more volatile memories only, one or more non-volatile memories only. In the context of this document, a "memory" or "computer-readable medium" may be any media or means that can contain, store, communicate, propagate or transport the instructions for use by or in connection with an instruction execution system, apparatus, or device, such as a computer.

The computer readable instructions/program code 73-1 may be pre-programmed into the control apparatus 6. Alternatively, the computer readable instructions 73-1 may arrive at the control apparatus 6 via an electromagnetic carrier signal or may be copied from a physical entity such as a computer program product, a memory device or a record medium such as a CD-ROM or DVD. The computer readable instructions 73-1 may provide the logic and routines that enables the print inspection system 1 to perform the functionality described above. The combination of computer-readable instructions stored on storage device(s) may be referred to as a computer program product. In general, references to computer program, instructions, code etc. should be understood to express software for a programmable processor firmware such as the programmable content of a hardware device as instructions for a processor or configured or configuration settings for a fixed function device, gate array, programmable logic device, etc.

Although various aspects of the methods and apparatuses described herein are set out in the independent claims, other aspects may comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims. The extent of protection is defined by the following claims, with due account being taken of any element which is equivalent to an element specified in the claims.

The invention claimed is:

1. A computer-implemented method for printed code inspection by a printed code inspection system operating in conjunction with a production line apparatus configured to move objects along a production line comprising:

receiving an image of an object to which a printed code comprising one or more printed characters should have been applied, the image having been captured when the object was located at a particular position on the production line;

analyzing the image to detect, based on a set of one or more character identification parameters, at least one candidate character within the image;

determining, for each of the at least one candidate characters and based on a set of one or more candidate character properties, a likelihood that the candidate character is one of the printed characters of the printed code that should have been applied to the object;

determining, based on the candidate characters determined as being likely to be one of the printed characters of the printed code that should have been applied to the object, and without use of optical character recognition in respect of the candidate characters determined as being likely to be one of the printed characters of the printed code that should have been applied to the object, whether the printed code is present and legible on the object;

outputting an indication as to whether the printed code that should have been applied to the object is present and legible on the object; and wherein determining whether the printed code is present and legible on the object is based at least in part on a size, shape, and/or orientation of a print box, wherein the print box is an area encompassing all of the candidate characters determined as being likely to be one of the printed characters of the printed code that should have been applied to the object.

2. The method of claim 1, wherein the printed code inspection system is also operating in conjunction with a coding device configured to apply printed codes to the objects, and the production line apparatus is configured to move the object from a first position on the production line at which the coding device applies printed codes to objects to the particular position on the production line where the image of the object is captured.

3. The method of claim 1, wherein determining whether the printed code is present and legible further comprises determining dimensions of an area encompassing all of the candidate characters determined as being likely to be one of the printed characters of the printed code based on dimensions of each respective one of the candidate characters determined as being likely to be one of the printed characters of the printed code.

4. The method of claim 1, wherein the method further comprises, for each candidate character determined as being likely to be one of the printed characters of the printed code, converting pixels contained by the candidate character determined as being likely to be one of the printed characters of the printed code into a text character using optical character recognition.

5. The method of claim 1, further comprising determining whether the printed code is correct based on the text characters.

6. The method of claim 1, wherein outputting the indication as to whether the printed code is present and legible comprises outputting the indication to a packaging line control apparatus.

7. The method of claim 1, further comprising:
generating a processed image comprising:
the received image and at least one of:
an indicator of a location for each detected candidate character, a bounding box of each candidate character determined as being likely to be one of the printed characters of the printed code, and an area encompassing the candidate characters determined as being likely to be one of the printed characters of the printed code; and causing display of the processed image.

8. The method of claim 1, wherein the set of one or more candidate identification parameters comprises one or more parameters indicative of a characteristic selected from the group consisting of:

a number of connected pixels, an elongation, a compactness, and wherein analyzing the image to identify the at least one candidate character of the printed code comprises:

detecting a set of connected pixels in the binary image;

determining the selected characteristic in the set of connected pixels; and determining that the set of connected pixels is a candidate character based on a comparison between the selected characteristic in the set of connected pixels and the one or more parameters indicative of the selected characteristic.

9. The method of claim 1, wherein the set of one or more candidate character properties comprises one or more properties indicative of a skew angle, and wherein determining that the candidate character is likely to be one of the printed characters of the printed code comprises:

determining a principal axis of the candidate character;

determining a skew angle of the candidate character based on the principal axis; and determining that the candidate character is likely to be one of the printed characters of the printed code based on a comparison of the skew angle and the one or more properties indicative of a skew angle.

10. The method of claim 1, wherein the set of one or more candidate character properties comprises one or more properties indicative of a bounding box area or dimensions, and wherein determining that the candidate character is likely to be one of the printed characters of the printed code further comprises:

generating a bounding box around the candidate character;

determining an area or dimensions of the bounding box; and determining that the candidate character is likely to be one of the printed characters of the printed code based on a comparison of the area or dimensions of the bounding box and the one or more properties indicative of a bounding box area.

11. The method of claim 1, further comprising:
determining a region of interest in the image;
wherein analyzing the image comprises analyzing only a portion of the image within the region of interest to detect at least one candidate character within the region of interest.

12. The method of claim 11, wherein determining the region of interest in the image comprises receiving an indication of the location and dimensions of the region of interest.

13. The method of claim 1, comprising, prior to receiving the image:

receiving a previous image containing a previous printed code comprising one or more printed characters;

analyzing, using an initial set of one or more character identification parameters, the previous image to detect at least one candidate character in the previous image;

causing display of the previous image and indications of the at least one candidate character in the previous image;

for each candidate character detected in the previous image, receiving a user indication indicating whether the candidate character is one of the printed characters of the previous printed code; and determining, based on the candidate characters indicated as being one of the printed characters, the set of one or more character identification parameters for use in analyzing the image to detect candidate characters and/or the set of one or more candidate character properties for use in determining likelihoods that the candidate characters detected in the image are printed characters of the printed code.

14. The method of claim 13, further comprising:

for each candidate character detected in the previous image which is not indicated by the user as being one of the printed characters of the previous printed code, determining that the candidate character is not one of the printed characters of the previous printed code.

15. The method of claim 13, further comprising:

receiving one or more user indications indicating the candidate characters which are not one of the printed characters of the previous printed code.

16. The method of claim 13, wherein the user indication comprises a selection of an individual indicator associated with a respective candidate character detected in the previous image.

17. The method of claim 13, wherein the user selection comprises a selection of an area of the previous image, the selected area containing at least one indicator of a location of a candidate character detected in the previous image.

18. The method of claim 13, wherein determining the set of one or more character identification parameters and the set of one or more candidate character properties is based on at least one of:

a maximum value found among the candidate characters indicated as being one of the printed characters of the previous printed code;

a minimum value found among the candidate characters indicated as being one of the printed characters of the previous printed code;

a maximum value found among the candidate characters indicated as being not one of the printed characters of the previous printed code; and a minimum value found among the candidate characters indicated as being not one of the printed characters of the previous printed code.

19. The method of claim 1, further comprising:

receiving printing data for the printed code, the printing data defining expected characteristics for the printed code;

configuring the set of one or more character identification parameters and the set of one or more candidate character properties based on the printing data; and determining, based on the candidate characters determined as being likely to be one of the printed characters of the printed code and the printing data, whether the printed code is present and legible.

20. The method of claim 1, wherein:

the printed code comprising one or more printed characters;

a plurality of candidate characters are within the image; and determining, for each of the candidate characters and based on a set of one or more candidate character properties, a likelihood that the candidate character is one of the printed characters of the printed code that should have been applied to the object.

21. The method of claim 1, wherein the printed code which should have been applied comprises a plurality of printed characters, wherein the at least one candidate character detected within the image comprises a plurality of candidate characters detected within the image, and wherein the at least one candidate character determined as being likely to be one of the printed characters of the printed code that should have been applied to the object comprises a plurality of candidate characters each being determined as being likely to be one of the printed characters of the printed code that should have been applied to the object.

22. The method of claim 1, wherein determining whether the printed code is present and legible on the object comprises:

in response to determining that the size of the print box is within a threshold of an expected size of the print box, determining that the printed code is present and legible.

* * * * *